J. E. ENTREKIN.
DRAFT APPARATUS FOR STUMP BURNERS.
APPLICATION FILED JUNE 3, 1912.
1,069,240.
Patented Aug. 5, 1913.
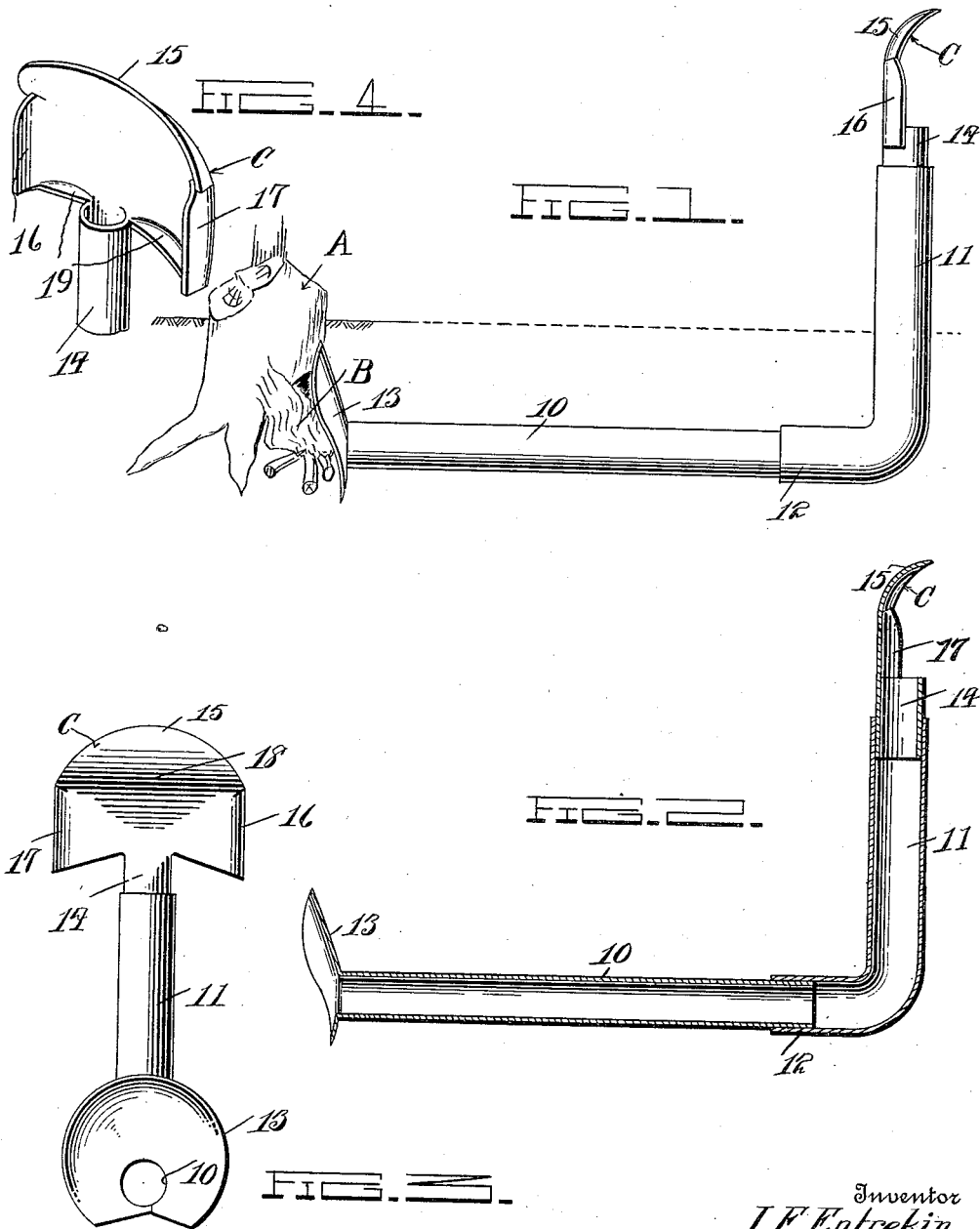

UNITED STATES PATENT OFFICE.

JAMES E. ENTREKIN, OF BILOXI, MISSISSIPPI.

DRAFT APPARATUS FOR STUMP-BURNERS.

1,069,240.　　　　Specification of Letters Patent.　　　Patented Aug. 5, 1913.

Application filed June 3, 1912. Serial No. 701,335.

*To all whom it may concern:*

Be it known that I, JAMES E. ENTREKIN, a citizen of the United States, residing at Biloxi, in the county of Harrison, State of Mississippi, have invented certain new and useful Improvements in Draft Apparatus for Stump-Burners; and I do hereby declare the following to be a full, clear, and exact description of the invention, such as will enable others skilled in the art to which it appertains to make and use the same.

This invention relates to draft apparatus for stump burners.

The object of the invention resides in the provision of an apparatus of the character referred to which when disposed in operative relation to a fire situated in a pit formed beneath the stump will supply an efficient draft to the fire so as to properly maintain the intensity of the heat issuing from the latter and as a result increase the rapidity with which the stump is reduced.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a view in elevation showing the apparatus applied in operative relation to a fire located beneath a stump, Fig. 2, a vertical section of the apparatus, Fig. 3, an end view of the apparatus, and Fig. 4, a detail perspective view of the wind deflecting member of the apparatus.

Referring to the drawings A indicates a stump and B a suitable fire disposed beneath the stump in a pit made for that purpose.

The draft apparatus is shown as comprising tubular sections 10 and 11, one end of the latter section being disposed at right angles to the remainder thereof as at 12, and said portion 12 of the section 11 telescopically engaging with one end of the section 10 so that said tubular section forms one complete conduit for air. It will of course be apparent that as the section 11 is disposed at right angles to the section 10 said sections 11 will extend vertically when the section 10 is disposed horizontally. The end of the section 10 remote from that telescopically engaged by the portion 12 terminates in a flared mouth 13 which is adapted to partially envelop the fire B so that the latter will receive the full effect of the draft supply through the tubular sections 10 and 11.

In order to utilize the force of the wind to increase the intensity of the draft of the apparatus there is provided a detachable wind deflecting member C which comprises a tubular portion 14 telescopically engaging in the outer end of the section 11. The end of the tubular portion 14 remote from that engaged with the section 11 terminates in a hood 15 which is so shaped that when same is directed against the wind it will serve to deflect the latter into the tubular portion 14 from whence it will pass through the sections 11 and 10 against the fire B. The hood 15 comprising specifically a plate having its side edges curved laterally in the same direction as at 16 and 17, while the top edge of said hood is also curved laterally in the same direction as the side edges as at 18 said laterally curved portion 18 overlying the upper end of the tubular portion 14. The bottom edge of the plate is also provided with a lateral flange 19 extending in the same direction as the curved side and upper edges. It will of course be understood that the tubular portion 14 is rotatable within the section 11 so that the hood 15 may be adjusted to proper position to deflect the wind into the tubular portion 14.

In calm weather the wind deflecting member C may be dispensed with if desired and efficient result can be had by the employment of the section 10 alone.

What is claimed is:

An apparatus for supplying draft to a stump burning fire disposed beneath the ground level, comprising a pair of tubular sections, one of said sections being angular and comprising horizontal and vertical arms, the former detachably telescoping with the outer end of the other section, a flared mouth on the inner end of the last named section for enveloping the fire cavity of a stump, and an air deflecting member rotatably mounted in the outer end of the vertical arm of said angular section, said deflector comprising a substantially flat plate, a tubular member formed integral with the plate and extending from one edge thereof and engaged in the outer end of the vertical arm of said angular section, the edges of said plate being provided with lateral flanges all of which extend in the direction of the side of said plate on which the tubular member is disposed.

In testimony whereof, I affix my signature, in presence of two witnesses.

JAMES E. ENTREKIN.

Witnesses:
GEORGE ROBB,
WILLIAM R. CARTER.